US009903774B2

(12) United States Patent
Nakayama et al.

(10) Patent No.: US 9,903,774 B2
(45) Date of Patent: Feb. 27, 2018

(54) ROBOT SYSTEM FOR MONITORING CONTACT FORCE OF ROBOT AND HUMAN

(71) Applicant: FANUC CORPORATION, Yamanashi (JP)

(72) Inventors: Kazutaka Nakayama, Yamanashi (JP); Junya Fujita, Yamanashi (JP); Youichi Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 27 days.

(21) Appl. No.: 15/143,622

(22) Filed: May 1, 2016

(65) Prior Publication Data

US 2016/0346935 A1 Dec. 1, 2016

(30) Foreign Application Priority Data

May 28, 2015 (JP) ................................ 2015-108918

(51) Int. Cl.
| | | |
|---|---|---|
| *G05B 15/00* | (2006.01) | |
| *G01L 5/22* | (2006.01) | |
| *B25J 13/08* | (2006.01) | |
| *B25J 9/16* | (2006.01) | |
| *G01L 5/16* | (2006.01) | |

(52) U.S. Cl.
CPC ............ *G01L 5/226* (2013.01); *B25J 9/1674* (2013.01); *B25J 13/085* (2013.01); *B25J 13/087* (2013.01); *G01L 5/161* (2013.01)

(58) Field of Classification Search
CPC ...... B25J 9/1694; B25J 9/1674; B25J 13/085; B25J 13/087; G01L 5/161; G01L 5/226
See application file for complete search history.

(56) References Cited

U.S. PATENT DOCUMENTS

| | | | | |
|---|---|---|---|---|
| 2004/0024488 A1* | 2/2004 | Seichter | ................. | G01D 3/036 700/193 |
| 2008/0043803 A1* | 2/2008 | Bandoh | .................. | G01K 1/143 374/100 |
| 2009/0259412 A1* | 10/2009 | Brogardh | ............... | B25J 9/1633 702/41 |
| 2012/0205931 A1* | 8/2012 | Ohta | ...................... | B25J 13/085 294/213 |
| 2012/0259464 A1 | 10/2012 | Morioka et al. | | |
| 2014/0277724 A1 | 9/2014 | Suyama et al. | | |

(Continued)

FOREIGN PATENT DOCUMENTS

| | | |
|---|---|---|
| CN | 104044141 A | 9/2014 |
| JP | 5-111891 A | 5/1993 |

(Continued)

OTHER PUBLICATIONS

JP2014124740 in view of JPO Translation; Jul. 7, 2014.*

*Primary Examiner* — Ian Jen
(74) *Attorney, Agent, or Firm* — Hauptman Ham, LLP

(57) ABSTRACT

The human cooperative robot system according to the present invention includes a robot, a force sensor detecting a load applied to a robot, and a robot controller controlling the robot. The force sensor includes at least one temperature detection element detecting temperature, incorporated therein. The robot controller determines whether or not to stop the operation of the robot based on the detected temperature output from the temperature detection element.

8 Claims, 5 Drawing Sheets

(56) References Cited

U.S. PATENT DOCUMENTS

2014/0365793 A1* 12/2014 Cox .................. G06F 1/206
  713/320
2016/0001410 A1* 1/2016 Koyama ............ B23Q 11/0007
  700/170

FOREIGN PATENT DOCUMENTS

| JP | 3067363 B2 | 7/2000 |
| JP | 2002-144277 A | 5/2002 |
| JP | 2004-314242 A | 11/2004 |
| JP | 2006-21287 A | 1/2006 |
| JP | 4650062 B2 | 3/2011 |
| JP | 2012-218094 A | 11/2012 |
| JP | 2014-124740 A | 7/2014 |

* cited by examiner

ROBOT SYSTEM FOR MONITORING CONTACT FORCE OF ROBOT AND HUMAN

RELATED APPLICATIONS

The present application claims priority to Japanese Patent Application Number 2015-108918 filed May 28, 2015, the disclosure of which is hereby incorporated by reference herein in its entirety.

BACKGROUND ART

1. Technical Field

The present invention relates to a human cooperative robot system which carries out work in the same workspace as a human. More specifically, the present invention relates to a robot system which monitors the contact force of a robot and a human and ensures the safety of the human.

2. Description of the Related Art

With respect to an industrial robot, in order to ensure the safety of humans, a safety fence is set up around the moveable area of a robot and humans are restricted from entering the area in which the robot can move. However, in recent years, instead of a safety fence, industrial robots on which certain measures have been carried out to ensure sufficient safety thereof to humans have allowed work to be carried out in a workspace shared by humans and robots. As a result, the desire for these types of robot, namely, human cooperative robots has increased.

By using a human cooperative robot system, separate work can be carried out by a human and a robot working in the same space, or a human can carry out work on a workpiece held by a robot. However, when using a human cooperative robot, when a human and a robot are sharing the same workspace, it is necessary to prevent injuries caused by a robot contacting the human. Accordingly, a method of monitoring the contact force between a human and a robot using a force sensor attached to a robot arm has been adopted. More specifically, if a contact force exceeding a predetermined threshold is detected by the force sensor, the operation of the robot is stopped, or the robot is moved in a direction to reduce the contact force.

Note that, in order to ensure the safety of a human, Japanese Patent No. 4650062 and No. 3067363, disclose a technology wherein the operation of a robot is controlled according to the temperature surrounding the robot.

Patent No. 4650062 discloses a robot controller which corrects the positioning accuracy of a robot by using temperature data from each of the temperature sensors provided on encoders of a plurality of motors which drive the robot.

Patent No. 3067363 discloses a moveable robot equipped with a plurality of sensors for detecting every type of abnormal state, in which one of the sensors is a temperature sensor, wherein the robot gives notification of an abnormality when the temperature measured by the temperature sensor exceeds a predetermined threshold.

In the aforementioned prior art, a force sensor for detecting the contact force comprises a force sensor body and an electrical resistance type strain gauge attached to the force sensor body. Further, the force sensor body is provided on a robot arm, the amount of strain on the force sensor body is detected by the strain gauge, and based on the detected value, the direction and size of the force applied to the robot arm are recognized. Accordingly, a material which is comparatively resilient to impact forces is selected as the material for the force sensor body to which the strain gauge is attached, and a metal is commonly used.

Therefore, the volume of the metal force sensor body can change due to the change in temperature of the surroundings of the robot. In such a case, the change in volume of the force sensor body caused by the temperature change is added to the amount of strain on the force sensor body caused by the force applied to the robot arm.

In other words, when the temperature of the surroundings of the robot changes from a first value to a second value, even if the same force is applied to the robot arm at each of the temperatures, the detected value by the force sensor will differ greatly between the first value and the second value.

Specifically, in a human cooperative robot system, when the contact force detected by the force sensor exceeds a predetermined threshold, the operation of the robot is stopped, or the robot is moved to reduce the contact force. Accordingly, to lessen bodily harm when contact is made with the robot, the threshold should ideally be set to as small a value as possible.

However, as described above, the value detected by the force sensor with respect to the same force, changes according to the temperature, and thus it is necessary to set the threshold while taking into account the change in the detected value caused by the temperature. Accordingly, there is the risk that the force sensor may not detect contact between a human and the robot after such an adjustment as the force applied to the robot which could previously have been detected by the force sensor, needs to be larger. As a result, there is an increased risk of the robot causing the human harm.

Note that Japanese Patent Nos. 4650062 and 306763 disclose a method of controlling the operation of the robot according to the temperature surrounding the robot, but the problem of detection accuracy of the contact force between the robot and the human is completely unrecognized.

SUMMARY OF THE INVENTION

The present invention provides a robot system which can suppress to a minimum, the risk of harm to a human by a robot when work is cooperatively carried out by a robot and a human.

According to the first embodiment of the present invention, the robot system comprises a robot, a load detector which detects a load applied to the robot, and a robot controller which controls the robot, wherein the load detector has at least one temperature detection element to detect the temperature and the robot controller is configured to determine whether or not to stop the operation of the robot on the basis of the detected temperature output from the temperature detection element.

According to the second aspect of the present invention there is provided the robot system of the first aspect, wherein the robot controller is configured to stop the operation of the robot when the detected temperature exceeds a first threshold.

According to the third aspect of the present invention, there is provided the robot system of the first and second aspects, wherein the robot controller is configured to stop the operation of the robot when a rise in temperature over a predetermined period of time exceeds a second threshold.

According to the fourth aspect of the present invention, there is provided the robot system of the first aspect wherein, the load detector has a plurality of the temperature detection elements, the robot controller is configured to monitor whether the temperature difference between the detected temperatures output from at least two temperature detection elements of the plurality of temperature detection elements exceeds a third threshold, and configured to stop the operation of the robot when the difference between the detected temperatures exceed a third threshold.

According to the fifth aspect of the present invention, there is provided the robot system of the fourth aspect, wherein the robot controller is configured to stop the operation of the robot when the detected temperature output from at least one temperature detection element of the plurality of temperature detection elements exceeds the first threshold.

According to the sixth aspect of the present invention, there is provided the robot system of the fourth or fifth aspect, wherein the robot controller is configured to stop the operation of the robot when an increase of the detected temperature output from at least one temperature detection element of the plurality of temperature detection elements over a predetermined period of time, exceeds the second threshold.

According to the seventh aspect of the present invention, there is provided the robot system of the fourth or fifth aspect, wherein the plurality of temperature detection elements includes at least two different types of temperature detection elements.

BRIEF DESCRIPTION OF THE DRAWINGS

The above mentioned objects, features, and advantages and other objects, features and advantages of the present invention will become more apparent from the following detailed description of the exemplary embodiments of the present invention illustrated in the accompanying drawings in which.

DETAILED DESCRIPTION

Figure 1:
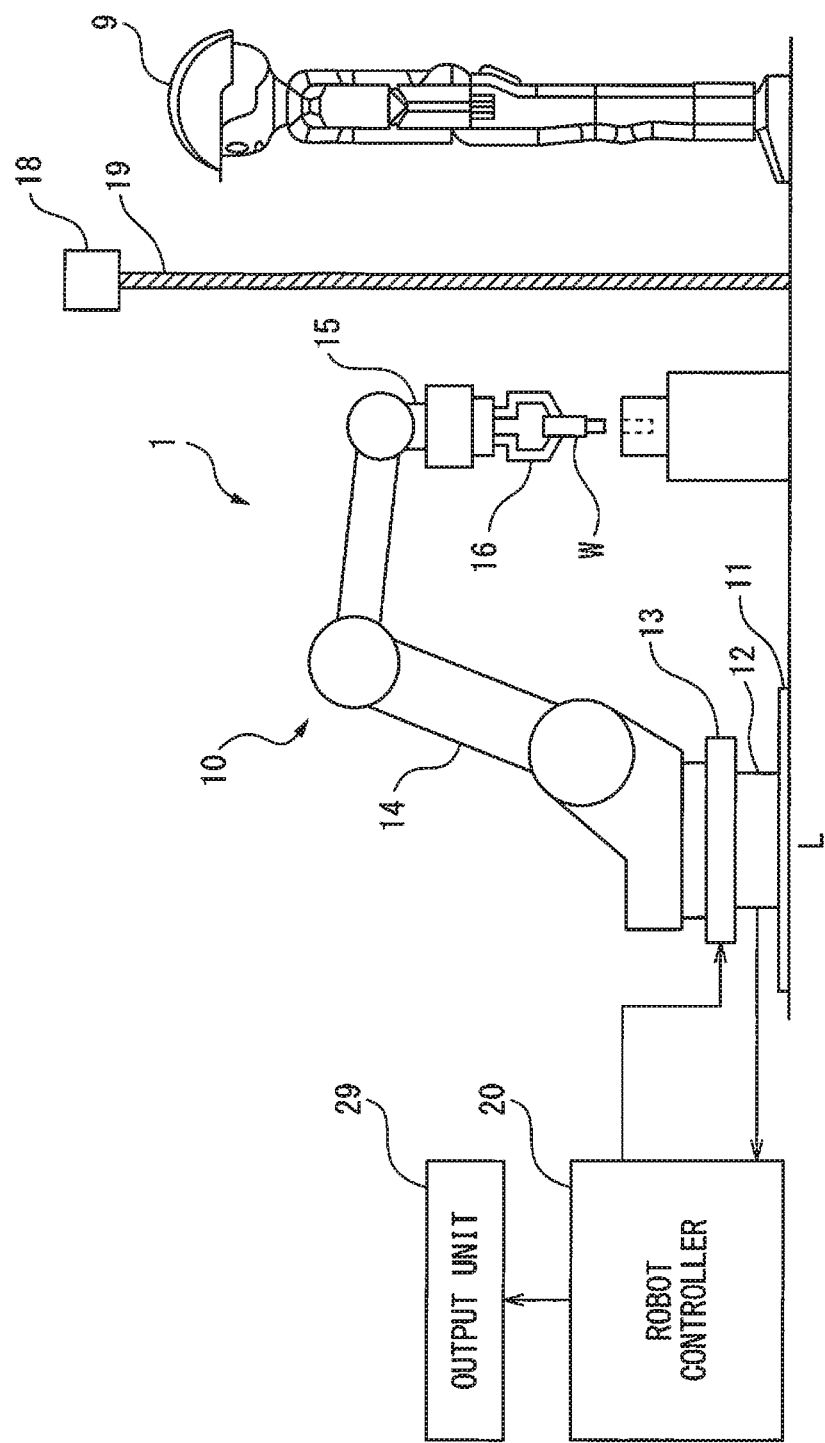
FIG. 1 is a side view illustrating the human cooperative robot system of the first embodiment.

Hereinafter, embodiments of the present invention will be described referring to the drawings. The same reference numbers for the same or corresponding constitutional elements are used over the drawings. The scale of the drawings showing the constitutional elements of the illustrated embodiments has appropriately been adjusted so as to facilitate the understanding of the present inventions.

(First Embodiment)

FIG. 1 is a side view of the human cooperative robot system according to the first embodiment. In the human cooperative robot system 1 illustrated in FIG. 1, a human 9 and a robot 10 approach each other in order to carry out cooperative work.

The robot 10 is a vertical multi-joint type manipulator. In order to install the robot 10 on the floor L, a fixing plate 11 is secured onto the floor L. Further, a force sensor 12 is provided on the fixing plate 11, furthermore a robot base 13 of the robot 10 is provided on the force sensor 12. The force sensor 12 is used as a load detector for detecting the load applied to the robot 10. Inside the force sensor 12, a strain detector, for example a strain gauge, specifically a semiconductor strain gauge, is provided for detecting the strain on force sensor 12 caused by an external force. More specifically, the force sensor 12 is provided with a force sensor body and a strain gauge attached to the force sensor body. Such a force sensor 12 measures the external force applied to the robot 10 and outputs the value of the measured external force. Note that the force sensor 12 may be attached to the robot base 13 or other portions of the robot, for example in the joint part of the robot arms 14.

Figure 3A:
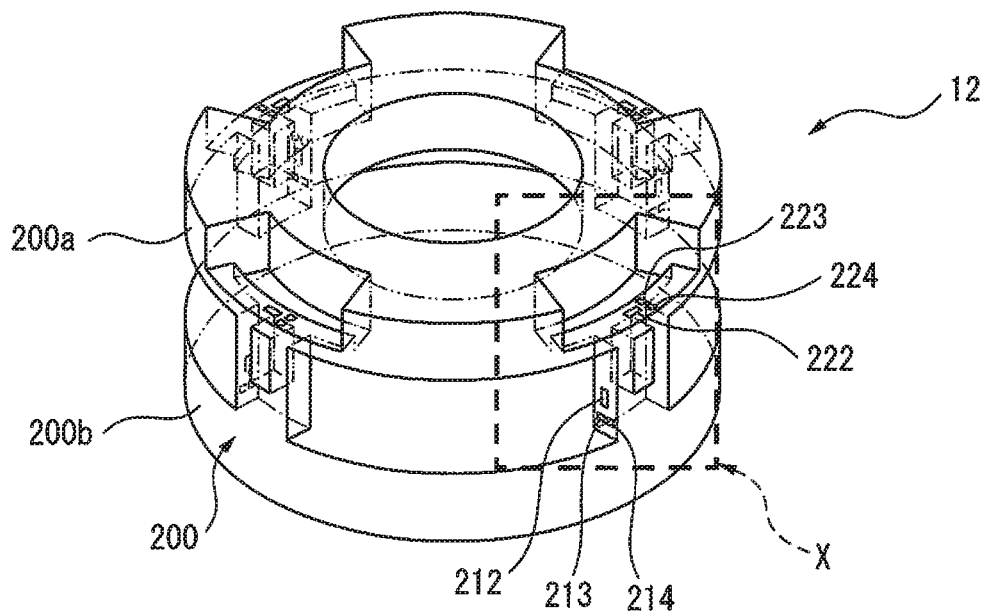
FIG. 3A is a perspective view of the force sensor of the third embodiment.
Figure 4A:
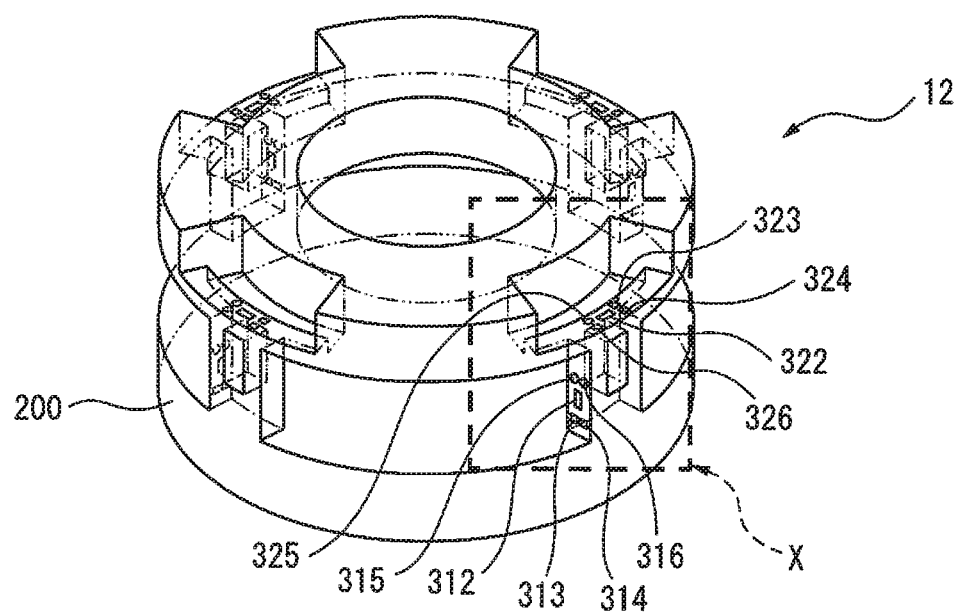
FIG. 4A is a perspective view of the force sensor of the fourth embodiment.

Further, the force sensor 12 has a plurality of temperature detection elements, for example, temperature sensors, incorporated therein (refer to FIG. 3A and 4A, etc.)

At the tip of the robot arm 14 of the robot 10, a robot wrist flange 15 is attached. A gripping hand 16 is provided at the tip of the robot wrist flange 15. The gripping hand 16 of the robot 10 grips a workpiece W which is at a predetermined location, and when the robot 10 moves the workpiece W to a target area, the gripping hand releases the workpiece W.

As illustrated in FIG. 1, in the vicinity of the robot 10, a human detector 18 is provided for detecting a human 9. The human detector 18 is an area sensor, and forms a two-dimensional detection area 19. Further, the human detector 18 confirms whether or not a human 9 or other obstacles are in the detection area 19. Note that the human detector 18 is connected to the robot controller 20.

Furthermore, the robot 10 is connected to the robot controller 20. The robot controller 20 is a digital computer and controls the operation of the robot 10.

Figure 2:
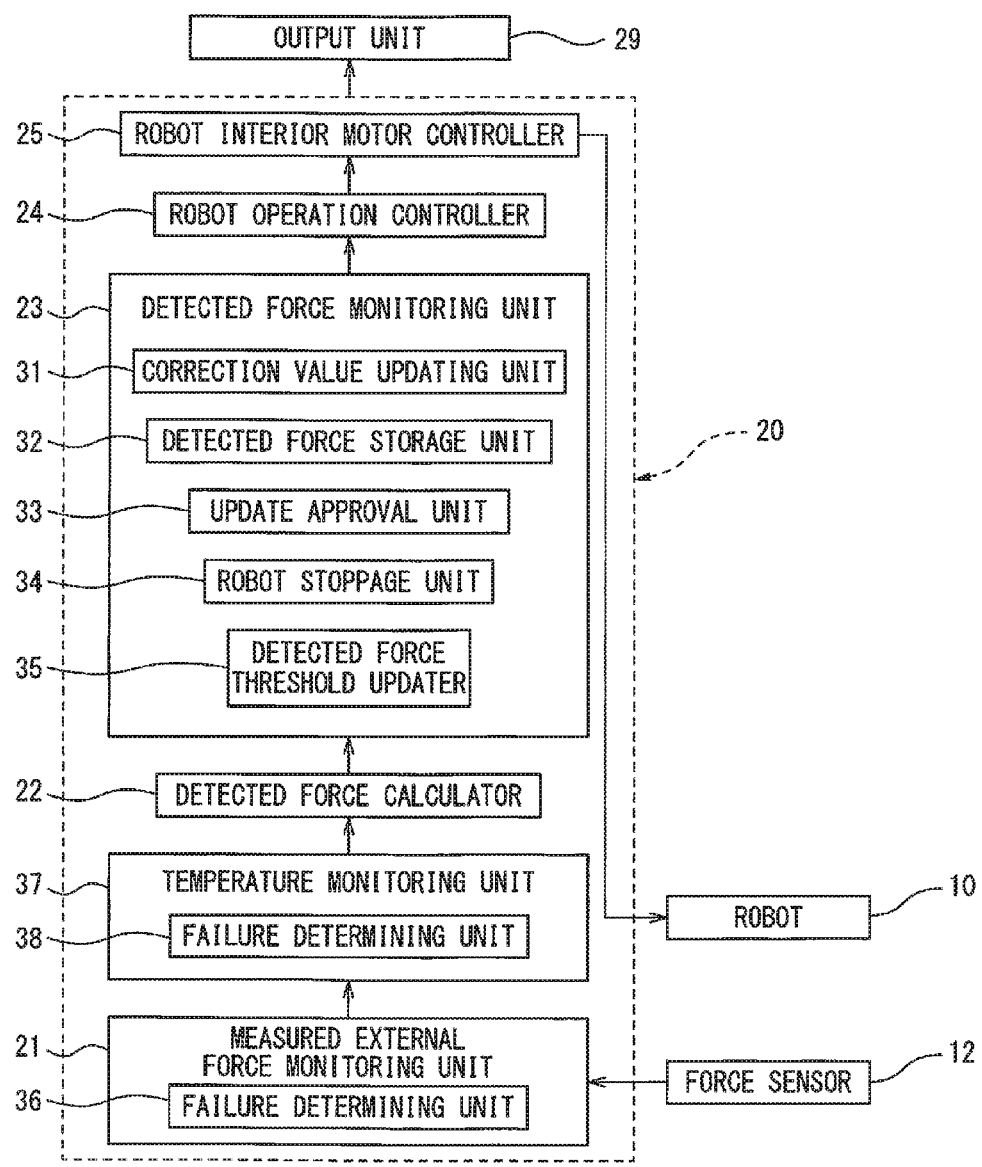
FIG. 2 is a block diagram illustrating the constituent elements of the robot controller of the human cooperative robot system illustrated in FIG. 1.

FIG. 2 is a block diagram illustrating the internal configuration of the robot controller 20 of the first embodiment.

With reference to FIG. 2, the robot controller 20 comprises a measured external force monitoring unit 21, which monitors the measured external force output from the force sensor 12, a detected force calculating unit 22 which calculates the detected force value by subtracting the correction amount from the measured external force output from the force sensor 12, and a detected force monitoring unit 23 which continuously monitors the state of the detected force output from the detected force calculating unit 22.

The robot controller 20 is further provided with a robot operation controlling unit 24 and a robot interior motor controlling unit 25.

The robot operation controlling unit 24 moves the robot 10 while continuously comparing the state of operation of the robot 10, for example stopped, accelerating, braking, moving at a fixed speed, and the state of the detected force monitored by the detected force monitoring unit 23.

The robot internal motor controlling unit 25 controls the motors (not shown) of respective shafts of the robot 10 according to the commands from the robot operation controlling unit 24. Further, an output unit 29 which is connected to the robot controller 20 outputs an alarm when necessary.

Further, the detected force monitoring unit 23 of the robot controller 20 comprises a correction value updating unit 31, a detected force value storage unit 32, an update approval unit 33, a robot stopping unit 34 and a detected force threshold updating unit 35.

The correction value updating unit 31 updates the detected force when predetermined conditions are satisfied as a correction value when the detected force calculating unit 22 calculates the detected force. The update process of the correction value carried out by the correction value updating unit 31 can be referred to as a reset process of the force sensor 12. The above predetermined conditions include that no human 9 in the vicinity of the robot 10 has been detected by the human detector 18.

The detected force value storage unit 32 stores the detected force value when the above predetermined conditions are met. Note that when the predetermined conditions are met, the detected force value storage unit 32 may sequentially store the detected force each time the detected force is calculated by the detected force calculating unit 22.

The update approval unit 33 approves the update process to be carried out by the correction value updating unit 31 when the human detector 18 detects that there is no human 9 near the robot 10.

The robot stopping unit 34 decelerates or stops the robot 10 when the detected force value updated by the correction value updating unit 31 exceeds the threshold for stopping the robot. Note that the robot stopping unit 34 may be included in the robot operation controlling unit 24 of the robot controller 20.

The detected force threshold updating unit 35 updates the threshold of the detected force according to the time that has passed since the correction value was updated by the correction value updating unit 31.

For example, the detected force may not be stable during a predetermined time from the start of operating the robot 10, and in such a case the force detection threshold is set to a first value and after a predetermined amount of time has passed the force detection threshold is changed to a second value.

Further, the measured external force monitoring unit 21 of the robot controller 20 includes a failure determining unit 36. The failure determining unit 36 monitors whether or not the amount of strain detected by the strain detector included in the force sensor 12 remains within the predetermined appropriate range. If the value does not fall within the predetermined appropriate range, it is judged that the force sensor 12 has broken or an abnormal strain value has been detected.

The temperature monitoring unit 37 of the robot controller 20 includes a failure determining unit 38. The failure determining unit 38 monitors whether or not the temperature detected by the temperature detection element included in the force sensor 12, namely, the temperature sensor satisfies a predetermined judgment criterion. If the judgment criterion is not satisfied, it is judged that the temperature sensor has been broken or that an abnormal temperature has been detected.

When at least one of the failure determining units 36 and 38 judges that a failure or abnormality has occurred, the robot controller 20 immediately stops the robot 10 and the output unit 29 connected to the robot controller 20 outputs an alarm. The alarm may use light, sound or voice, etc., alone or in combination.

Further, in the first embodiment, the judgment criterion of the failure determining unit 38 of the temperature monitoring unit 37 is set at 45° C. Accordingly, when the detected temperature output from the temperature sensor in the force sensor 12 is over 45° C., the failure determining unit 38 immediately stops the robot 10.

Namely, the judgment criterion of the failure determining unit 38 of the temperature monitoring unit 37 is a value which was calculated beforehand by the developers as a temperature value at which the robot 10 has an increased risk of causing harm to humans. Further, if the temperature sensor in force sensor 12 detects a temperature in excess of the judgment criterion, the robot 10 is immediately stopped, and the risk of causing harm to a human can be minimized.

(Second Embodiment)

Next, the second embodiment will be described. Note that, in each of the embodiments including the second embodiment described below, the structural elements which are the same as those in the first embodiment will have the same reference numerals and only points different to the first embodiment will be described.

In the second embodiment, with respect to the first embodiment, the failure determining unit 38 of the temperature monitoring unit 37 calculates the temperature rise amount of the detected temperature output from the temperature sensor in the force sensor 12, over a predetermined period of time. The failure determining unit 38 determines whether or not the temperature rise amount exceeds a predetermined threshold. If the threshold is exceeded, the robot 10 is immediately stopped.

For example, if the predetermined time period is one minute and the temperature rise amount of the detected temperature output from the temperature sensor of the force sensor 12 exceeds 1° C., the failure determining unit 38 immediately stops the robot 10.

Namely, with respect to the same force being applied to force sensor 12, the external force measurements may drastically change according to the temperature surrounding the robot 10. Accordingly, if the detected temperature output from the temperature sensor in the force sensor 12 over a one minute period, exceeds 1° C., a judgment that the external force measured value of the force sensor 12 has become unreliable can be made. For example, if some sort of abnormality occurs with the temperature sensor in the force sensor 12, or if a high temperature heat source is generated near the force sensor 12 for some reason, the accuracy of the detection by the force sensor 12 cannot be maintained. In the second embodiment, if the detection accuracy of the force sensor 12 cannot be maintained, the operation of the robot 10 is stopped and it is possible to minimize the risk of harm to a human.

(Third Embodiment)

Figure 3B:
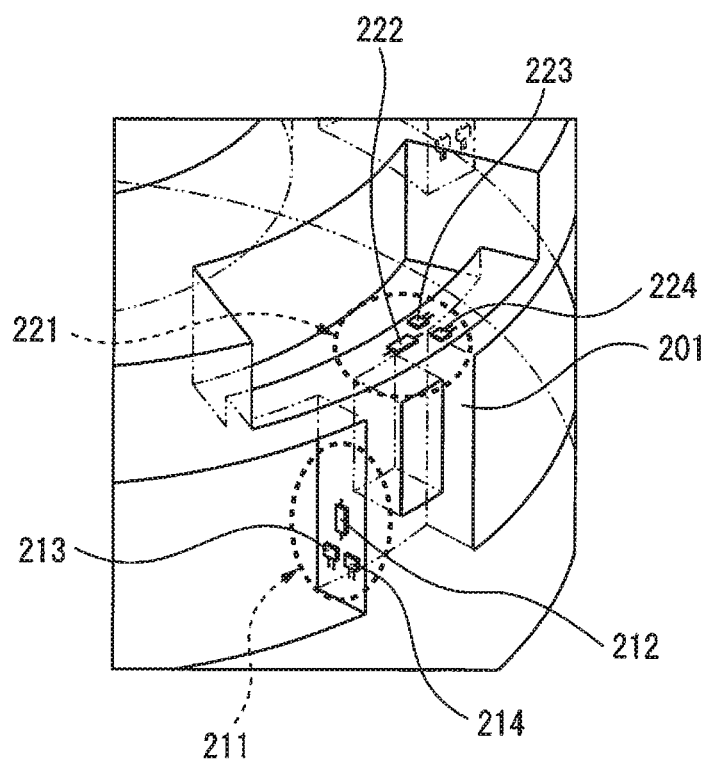
FIG. 3B is an enlarged view of a portion enclosed by the dotted line X in FIG. 3A.
Figure 3C:
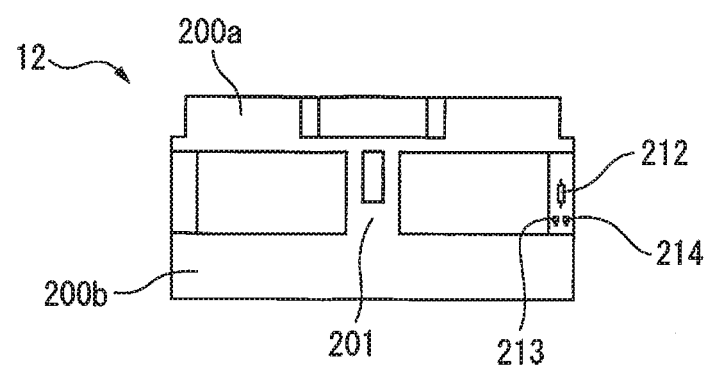
FIG. 3C is a side view of the force sensor illustrated in FIG. 3A.

Next, the third embodiment will be described. FIG. 3A is a perspective view of the force sensor 12 of the third embodiment. FIG. 3B is an enlarged view of the portion enclosed by the dotted line X in FIG. 3A, and FIG. 3C is a side view of the force sensor illustrated in FIG. 3A.

The force sensor 12, as illustrated, in FIG. 3A, comprises a force sensor body 200 and a plurality of load detection elements, for example, strain gauges 212 and 222 attached to the force sensor body. Furthermore, as illustrated in FIG. 3B, the force sensor 12 has a plurality of load detection portions 211 and 221. In the first load detection portion 211, two temperature sensors 213 and 214 are arranged near the one strain gauge 212. Similarly, in the second load detection portion 221 two temperature sensors 223 and 224 are arranged near the one strain gauge 222. Note that, regarding the position the two temperature sensors 213 and 214 (or 223 and 224) are arranged, instead of the positions illustrated in FIG. 3B, the two temperature sensors may be arranged in two positions so that the strain gauge 212 (or 222) is interposed therebetween.

Furthermore, the same type of temperature sensor is used for the two temperature sensors 213 and 214 arranged on the first load detection portion 211. Therefore, during normal conditions, the same detected temperature is output from the two temperature sensors 213 and 214 arranged on the first load detection portion 211. Similarly the same type of temperature sensor is used for the two temperature sensors 223 and 224 arranged on the second load detection portion 221. Therefore, during normal conditions, almost the same detected temperature is output from the two temperature sensors 223 and 224 arranged on the second load detection portion 221. In other words, if the difference between the detected temperatures output from the same type of temperature sensors exceeds the difference between the temperature sensors due to an individual difference, at least one of the temperature sensors is either in an abnormal environment or is broken.

Accordingly, the temperature monitoring unit 37 illustrated in FIG. 2 monitors whether or not the difference in the detected value between the two temperature sensors 213 and 214 (or 223 and 224), provided in the load detection portions 211 (or 221), exceeds a predetermined threshold. Further, if the difference between the two temperature sensors exceeds a predetermined threshold, for example, 2° C., the failure determining unit 38 of the temperature monitoring unit 7 immediately stops the robot 10.

As described above, the load detection portion 211 (or 221) is provided with a plurality of temperature sensors 213 and 214 (or 223 and 224) of the same type. As such, the operation of the robot 10 can be stopped in accordance with smaller temperature changes on each load detection portion 211 and 221. Therefore the third embodiment has an even higher level of safety with respect to humans than the second embodiment.

Note that, as it is necessary for the force sensor body 200 to be relatively resistant to impacts, and therefore metal is used as the material therefor. Further, the force sensor body 200, as illustrated in FIGS. 3A and 3C, is formed such that an annular member 200a and a disc-like member 200b face each other and are connected to each other by four columns 201. According to this embodiment, there are four columns; however, the number of columns does not have to be four. The columns 201 are deformed when the annular member 200a and the disc-like member 200b are moved relative to each other. For this reason, in the third embodiment the load detection portion 211 is provided on the vertical plane of the columns 201 and the load detection portion 221 is provided on the horizontal plane of the columns 201. Further, by providing the load detection portions 211, 221 illustrated in FIG. 3B on each of the four columns 201 illustrated in FIG. 3A, it is possible to detect local temperature rises of the force sensor body 200.

Furthermore, when using the force sensor 12 of the third embodiment on the robot 10 (refer to FIG. 1), the annular member 200a is secured to the robot base 13 and the disc-like member 200b is secured to the fixing plate 11.

Moreover, in the third embodiment, if the detected temperature output by at least one of a plurality of temperature sensors 213, 214 (or 223, 224) provided on each of the load detection portions 211 (or 221), exceeds 45° C., the failure determining unit 38 may immediately stop the robot 10. Namely, if even one of the plurality of temperature sensors incorporated in the force sensor 12 indicates an abnormal temperature, it is determined that it is highly probable that one of the temperature sensors has broken and the robot 10 is immediately stopped. Or, if a plurality of temperature sensors indicates abnormal temperatures, it is judged that the ambient temperature has risen too much and the conditions cannot allow a force to be detected correctly and the robot 10 is immediately stopped. Accordingly, even in a human cooperative system 1 which is provided with a plurality of load detection portions 211, 221, in the force sensor 12 to obtain a precise external force, it is possible to minimize the risk of harm to a human.

Furthermore, in the third embodiment, if the temperature rise amount of the detected temperature output from at least one of the plurality of temperature sensors 213, 214 (or 223 and 224) arranged in the load detection portions 211 (or 221) exceeds 1° C. per minute, the failure determining unit 38 may be set to immediately stop robot 10. In this way, the robot is controlled based on the temperature detected by the plurality of temperature sensors which exists in the force sensor 12 and it is possible to suppress the risk of harm to a human to a minimum.

(Fourth Embodiment)

Figure 4B:
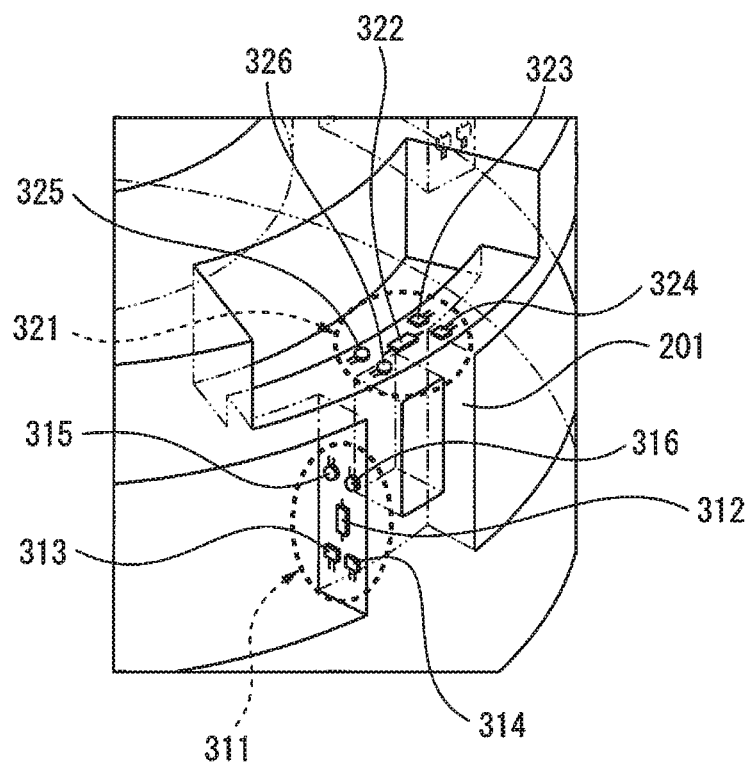
FIG. 4B is an enlarged view of the portion enclosed by the dotted line X in FIG. 4A.
Figure 4C:
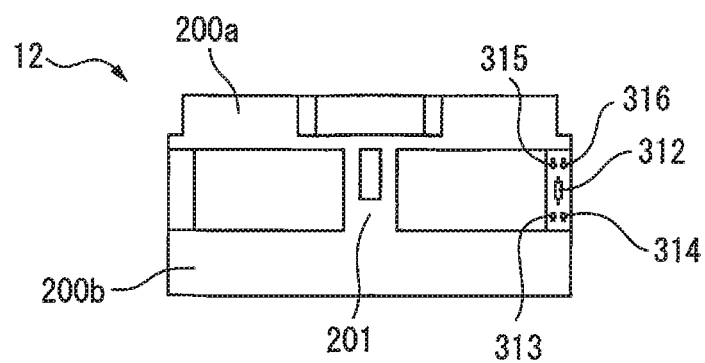
FIG. 4C is a side view of the force sensor illustrated in 4A.

Next, the fourth embodiment will be explained. FIG. 4 is a perspective view of the force sensor 12 of the fourth embodiment. FIG. 4B is an enlarged view of a portion enclosed by the dotted line X in FIG. 4A, 4C is a side view of the force sensor 12 illustrated in FIG. 4A.

The force sensor 12 of the fourth embodiment is the same as the third embodiment with respect to a plurality of load detection portions 311, 321 provided on the column 201 of the force sensor body. The fourth embodiment differs from the third embodiment in the number of temperature sensors on the load detection portions 311, 321 and the environment-resistant property thereof.

Specifically, as illustrated in FIG. 4B, in one load detection portion 311 (or 321), four temperature sensors 313, 314, 315 and 316 (or 323, 324, 325 and 326) are arranged in proximity to one strain gauge 312 (or 322). Note that the four temperature sensors 313, 314, 315 and 316 (or 323, 324, 325 and 326), as illustrated in FIGS. 4A and 4B, are arranged to surround the strain gauge 312 (or 322).

Further, of the four temperature sensors 313, 314, 315 and 316 in the first load detection portion 311, the two temperature sensors 313 and 314 are the same type of water resistant or oil resistant temperature sensor. The remaining two temperature sensors 315 and 316 are the same type of heat resistant temperature sensor. Similarly, of the four temperature sensors 323, 324, 325 and 326 in the second load detection portion 321, the two temperature sensors 323 and 324 are the same type of water resistant or oil resistant temperature sensor. The remaining two temperature sensors 325 and 326 are the same type of heat resistant temperature sensor. Note that, in the aforementioned third embodiment, the two temperature sensors 213 and 214 (or 223 and 224) illustrated in FIG. 3B may be either of the same type or may be different types.

By providing at least two types of temperature sensor that differ in the environments to which they are resistant such as water-resistant, oil-resistant and heat-resistant, the force sensor 12 is always able to carry out stable force detection in various environments. Accordingly, a human cooperative robot which is highly stable with respect to various environments can be provided. Note that, as an environment-resistant temperature sensor, other than the aforementioned water-resistant, oil-resistant and heat-resistant types, a dust-proof or impact-resistant temperature sensor may be used.

Further, as a temperature sensor, a thermocouple which directly detects the temperature of the force sensor body 200 may be used. In such cases, it is preferable that at least one of the plurality of temperature sensors be a non-contact temperature sensor, for example one that detects the temperature from infra-red light which is received.

Thermocouple type temperature sensors may, for some reason, peel off from the force sensor body 200, and thus stop functioning. In this respect, the problem of the temperature sensor peeling off will not occur with a non-contact temperature sensor which is not required to directly contact the force sensor body 200. As non-contact temperature sensors are generally very expensive, making all of the temperature sensors a non-contact type will be considerably costly. However, it is possible to reduce the cost by using a non-contact temperature sensor for only a portion of the plurality of temperature sensors.

Note that in each of the above embodiments, a strain gauge is used as a load detection element. However, a load detection element applicable to the present invention is not limited thereto. The present invention can be applied to any type of industrial robot which is equipped with a load detection element having the possibility of changing the detected value resulting from the change in temperature of the environment.

Further, the invention has been described above by exemplifying the robot 10 as a vertical multi-articulated manipulator. However, the invention is not limited to such a manipulator, and rectangular coordinate robots, cylindrical coordinate robots and polar coordinate robots may be applied.

Furthermore, the above indicated embodiments are typical. However, the present invention is not limited to the aforementioned embodiments and the shape, configuration and materials may be changed within a range not deviating from the spirit of the present invention.

The Effects of the Embodiments of the Invention

According to the first embodiment of the present invention, the load detector which detects the load on the robot has incorporated therein temperature detection element. Further, the robot controller decides whether or not to stop the operation of the robot based on the detected temperature output from the temperature detection element. Accordingly, if there is a possibility of a change in the value detected by the load detector resulting from a change in the surrounding temperature, the risk of the robot causing harm to a human is considered and it is possible to stop the robot. Accordingly, the most important function of a human cooperative robot, safety, is improved.

According to the second embodiment of the present invention, the robot controller stops the operation of the robot if the detected temperature which is output from a temperature detection element exceeds a first threshold. Accordingly, it is possible to minimize the risk, by setting the first threshold to the temperature value at which the risk of harm to a human by a robot increases.

According to the third embodiment of the present invention, the robot controller stops the operation of the robot, if the temperature rise amount detected by the temperature detection element over a predetermined time exceeds a second threshold. Namely, when the value detected by the load detector becomes inaccurate due to a dramatic rise in the surrounding temperature of the robot, the risk of the robot causing harm to a human increases. In such cases, as the operation of the robot can be stopped immediately, it is possible to minimize the risk of harming a human.

According to the fourth embodiment, a plurality of temperature detection elements is incorporated in the load detector. If the difference between the detected temperatures, output from at least two of the temperature detection elements exceeds a third threshold, the operation of the robot is stopped. Accordingly, if there is an abnormality in any of the temperature detection elements, the operation of the robot can be stopped and thus it is possible to improve the safety of the robot with respect to a human.

According to the fifth embodiment of the present invention, the operation of the robot of the fourth embodiment is also stopped if the detected temperature output from at least one of the plurality of temperature detection elements incorporated in the load detector, exceeds the first threshold temperature. Accordingly, it is possible to further improve the safety of the fourth embodiment with respect to humans.

According to the sixth embodiment, in the fourth or fifth embodiment, when the detected value from the load detector becomes inaccurate due to a sudden rise in temperature around the robot, the operation of the robot can be immediately stopped, thus it is possible to further enhance the safety of the robot with respect to a human.

According to the seventh embodiment of the present invention, of the plurality of temperature detection elements incorporated in the load detector, at least two temperature detection elements differ in type. Accordingly, the load sensor is always able to stably carry out force detection in various environments. Furthermore, by providing such a load detector to a robot, a human cooperative robot with increased safety with respect to various environments can be provided.

The invention claimed is:

1. A robot system comprising:
a robot;
a load detector which detects the load applied to the robot; and
a robot controller which controls the robot, wherein
the load detector has a plurality of temperature detection elements to detect temperatures, and
the robot controller is configured to
monitor whether a temperature difference between the detected temperatures output from at least two temperature detection elements of the plurality of temperature detection elements exceeds a third threshold, and
stop the operation of the robot when the difference between the detected temperatures exceed the third threshold.

2. The robot system according to claim 1, wherein the robot controller is configured to stop the operation of the robot when the detected temperature output from at least one temperature detection element of the plurality of temperature detection elements exceeds a first threshold.

3. The robot system according to claim 1, wherein the robot controller is configured to stop the operation of the robot when an increase of the detected temperature output from at least one temperature detection element of the plurality of temperature detection elements over a predetermined period of time exceeds a second threshold.

4. The robot system according to claim 2, wherein the robot controller is configured to stop the operation of the robot when an increase of the detected temperature output from at least one temperature detection element of the plurality of temperature detection elements over a predetermined period of time exceeds a second threshold.

5. The robot system according to claim 1, wherein the plurality of temperature detection elements includes at least two different types of temperature detection elements.

6. The robot system according to claim 2, wherein the plurality of temperature detection elements includes at least two different types of temperature detection elements.

7. The robot system according to claim 3, wherein the plurality of temperature detection elements includes at least two different types of temperature detection elements.

8. The robot system according to claim 4, wherein the plurality of temperature detection elements includes at least two different types of temperature detection elements.

* * * * *